United States Patent [19]

Wenrick

[11] 4,243,711
[45] Jan. 6, 1981

[54] TWO PIECE TRIM STRIP
[75] Inventor: Brian A. Wenrick, Dayton, Ohio
[73] Assignee: Protective Treatments, Inc., Dayton, Ohio
[21] Appl. No.: 859,749
[22] Filed: Dec. 12, 1977
[51] Int. Cl.³ .......................... B32B 3/30; B32B 7/06
[52] U.S. Cl. ...................................... 428/31; 52/716; 293/1; 428/163
[58] Field of Search ............... 428/31, 77, 163; 293/1, 293/62, DIG. 4, 108, 121, 126, 127; 52/716

[56] References Cited
U.S. PATENT DOCUMENTS

| 3,046,174 | 7/1962 | Brooks et al. | 428/31 X |
| 3,606,432 | 9/1971 | Honatzis | 428/31 X |
| 3,635,787 | 1/1972 | Shanok et al. | 428/164 X |
| 3,711,360 | 1/1973 | Kent | 428/157 X |
| 3,745,056 | 7/1973 | Jackson | 428/164 X |
| 3,811,989 | 5/1974 | Hearn | 428/174 X |
| 3,841,682 | 10/1974 | Church et al. | 52/716 X |
| 3,881,042 | 4/1975 | Ungerer | 428/31 X |
| 4,010,297 | 3/1977 | Wenrick | 428/31 |
| 4,015,760 | 4/1977 | Bott | 428/31 X |

Primary Examiner—Henry F. Epstein
Attorney, Agent, or Firm—Dressler, Goldsmith, Shore, Sutker & Milnamow, Ltd.

[57] ABSTRACT

A two piece trim strip, especially adapted to be mechanically secured to an automobile bumper, is provided in which a soft resilient elongated carrier is formed to include, in cross-section, a lateral support carrying a pair of forwardly protruding protective rails, one rail on each side of the support, each of the rails being formed with an outwardly extending lateral channel adjacent the lateral support, and an elongated decorative strip is mounted on the carrier with its side edges in each of the channels when the rails are flexed outwardly to facilitate insertion of the decorative strip.

10 Claims, 1 Drawing Figure

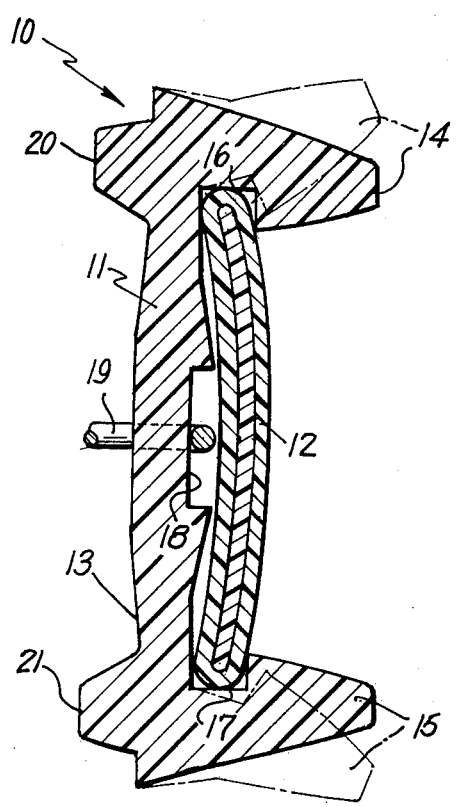

TWO PIECE TRIM STRIP

The present invention relates to a two piece trim strip which is particularly adapted to be mounted on an automobile bumper, though it can be used in other locations, as on the sides of the automobile body.

Particularly when a trim strip is to be employed on a bumper, it is necessary to positively secure the trim strip to the bumper, and this can be difficult, especially when the bumper or bumper section is made in a single piece.

In this invention, the trim strip is constituted by a soft resilient elongated carrier which, in cross-section, includes a lateral support carrying a pair of forwardly protruding protective rails, one on each side, each of these rails being formed with an outwardly extending lateral channel adjacent the lateral support, so that an elongated decorative strip can have its side margins inserted in the lateral channels while the carrier is secured to the bumper in any desired manner via its lateral support. In preferred practice, securement to the bumper is by mechanical means which extend through the lateral support, such as staples, stitches, screws or similar mechanical securement, the securement being concealed by the overlying decorative strip. The result is the availability of mechanical securement which cannot be seen and a dorative strip which can be inserted after securement and which is protected from impart by the resilient rails.

The invention will be more fully understood from the description of an illustrative embodiment which is shown in cross-section in the accompanying drawing.

Referring more particularly to the drawing, the trim strip generically identified at 10 is commonly termed a "nerf", and it is constituted by two pieces, namely, an elongated soft resilient carrier 11 and a decorative strip 12. The carrier 11 and strip 12 are each separately formed by extrusion and are cut to desired length for use.

As can be seen, the carrier 11 is formed by extrusion of soft flexible material into a cross-section which defines a lateral support 13 which carries forwardly protruding protective rails 14 and 15, one on each side of the support 13. Each of the rails 14 and 15 are formed with a laterally extending channel adjacent the lateral support 13, rail 14 defining channel 16 and rail 15 defining channel 17.

Since carrier 11 is soft and resilient, the forwardly protruding rails 14 and 15 can be flexed outwardly as shown in phantom lines to facilitate insertion of the decorative strip 12 which is relatively hard and impact resistant. Strip 12 is dimensioned so that its side margins extend into the laterally extending channels 16 and 17.

By the use of terms such as "soft", "flexible", and "resilient", it is intended to describe a material which can be flexed sufficiently by hand installation (in which simple tools may be used) to permit the decorative strips to be inserted after the carrier has been secured to the substrate to be decorated.

In preferred practice, a portion of the forward face of lateral support 13 is recessed as shown at 18 to receive a mechanical securing element behind the decorative strip 12. In the form of the invention pictured, a wire 19 has been stitched through the support 13 (and also through the supporting bumper which is not shown) in order to secure the carrier 11 in its desired location. As will be evident, the carrier 11 is secured in its desired location before the decorative strip 12 is put in place.

The insertion of strip 12 in the locking channels 16 and 17 relies primarily upon the resiliency of the rails 14 and 15, but the strip 12, while normally hard, is still capable of flexing, and the flexing of strip 12 may be relied upon to aid its insertion.

Rails 14 and 15 provide considerable protection on impact since they are soft and absorb a blow. The preferred decorative strips are bright and reflective, and the presence of rails 14 and 15 helps to protect the strip from most impacting objects. However, by using heavy Mylar film of about 2 mils in thickness, and by encapsulating a thin reflective aluminum film against the Mylar using a transparent plastic, the strip 12 may itself acquire considerable impact resistance. The provision of a reflective strip which is itself impact resistant is more fully described in the copending application of myself and Harvey E. Svetlik, Ser. No. 719,715, filed Sept. 2, 1976. Instead of a bright reflective strip, one can use pigmented strips to provide desired color combinations.

It is desirable to have the lateral support 13 flex toward the substrate when the mechanical securement is in place, and this is achieved by having rearward protrusions 20 and 21 on opposite sides of the securing means, here constituted by the central stiches of wire 19.

Among the permissible variations, a layer of pressure sensitive adhesive may be used between the rear face of strip 12 and the forward face of lateral support 13, but it is a feature of preferred practice in this invention that such an adhesive is not needed herein. Also, a layer of pressure sensitive adhesive may be used between the rearward protrusions 20 and 21 to either supplement or replace the mechanical securement preferably used herein.

From the standpoint of materials, the carrier 11 is preferably constituted by pigmented and heavily plasticized polyvinyl chloride so as to provide an extruded carrier which is easily flexed with finger pressure.

From the standpoint of dimensions, the outside width will vary from about ¼ inch to about 4 inches, or even wider, but is preferably ¾ inch to 2 inches. The interior width between the rails will range from about ¼ inch to about 3½ inches, preferably ⅜ inch to 1¾ inch. The channels will desirably extend into the base of the rails for a distance of 10% to 75% of the width of the rails, preferably from 25% to 60% of its width.

In an illustrative example, the carrier has an outside width of 1 1/16 inches, and an interior width of ⅝ inch. The strip is ⅝ inch in width, the channels extend half way through the rails and the distance from the tip of the rails to the rear of the rearward protrusions is ½ inch.

In this example, the carrier is a pigmented and heavily plasticized polyvinyl chloride having the following composition:

50% polyvinyl chloride
35% dioctyl phthalate
2% epoxidized soya bean oil
1.7% barium-cadmium-zinc-type stabilizer
0.5% carbon black
9.5% calcium carbonate.

The composition is prepared by heating the polyvinyl chloride to 160° F. and then adding, with vigorous agitation, the remaining ingredients. Agitation is continued while the mixture is heated to 215° F. whereupon the mixture is dumped and cooled. The mixture is extruded to provide the carrier at a temperature in the range of 325°–360° F.

The strip 12 is usually substantially flat, but it is preferred that it be slightly laterally curved to provide a convex external appearance. This curvature is supported by the forward tilt of the support 13 as it approaches the center of the carrier.

The invention is defined in the claims which follow.

I claim:

1. A two piece trim strip comprising a soft resilient elongated carrier which, in cross-section, includes a lateral support carrying a pair of forwardly protruding protective rails, one rail on each side of said support, each of said rails being formed with an outwardly extending lateral channel adjustment said lateral support, and an elongated decorative strip adapted to be mounted with its side edges in each of said channels when said rails are flexed outwardly to facilitate insertion of said decorative strip, said rails extending forwardly of said strip.

2. A two piece trim strip as recited in claim 1 in which said carrier has an outside width of about ½ inch to about 4 inches and an interior width between the rails of about ¼ inch to about 3½ inches, and said channels extend into said rails for a distance of 10% to 75% of the width of the rails.

3. A two piece trim strip as recited in claim 1 in which said carrier has an outside width of ¾ inch to 2 inches and an interior width between the rails of about ⅜ inch to 1¾ inches, and said channels extend into said rails for a distance of 25% to 60% of the width of the rails.

4. A two piece trim strip as recited in claim 1 in which said carrier is an extrusion of pigmented, heavily plasticized polyvinyl chloride.

5. A two piece trim strip as recited in claim 1 in which said decorative strip is substantially flat.

6. A two piece trim strip as recited in claim 1 in which said strip is slightly laterally curved within the carrier to provide a convex external appearance.

7. A two piece trim strip as recited in claim 6 in which said lateral support is shaped to provide a forward tilt as it approaches the center of the carrier to support said strip in its convex configuration.

8. A two piece trim strip as recited in claim 1 in which the forward face of said lateral support is recessed to receive a mechanical securing element beneath said rear face of said strip.

9. A two piece trim strip as recited in claim 1 in which said carrier is formed with rearward protrusions on opposite sides of said lateral support.

10. A two piece trim strip comprising a resilient elongated carrier which, in cross-section, includes a lateral support carrying a pair of forwardly protruding protective rails, one rail on each side of said support, each of said rails being formed with an outwardly extending lateral channel adjacent said lateral support, and a hard elongated decorative strip mounted on said support with its side edges in each of said channels, said rails extending forwardly of said strip.

* * * * *